(12) United States Patent
Rudge et al.

(10) Patent No.: US 8,908,236 B1
(45) Date of Patent: Dec. 9, 2014

(54) MEDIA PLATEN USED TO SCAN AND MEASURE MEDIA SIZE IN A TRAY

(71) Applicant: Xerox Corporation, Norwalk, CT (US)

(72) Inventors: Wayne Rudge, Berks (GB); Peter Granby, Hertfordshire (GB); Stephen Foster, Hertfordshire (GB); Richard Bradford, Hertfordshire (GB); John A. Kerslake, Hertfordshire (GB); Christopher D. Olliffe, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/966,812

(22) Filed: Aug. 14, 2013

(51) Int. Cl.
*G03G 15/00* (2006.01)
*H04N 1/40* (2006.01)
*H04N 1/00* (2006.01)

(52) U.S. Cl.
CPC ....... *H04N 1/00708* (2013.01); *H04N 1/00737* (2013.01); *H04N 1/00771* (2013.01); *H04N 1/00408* (2013.01); *H04N 2201/0094* (2013.01); *H04N 2201/0081* (2013.01)
USPC .......................................... 358/449; 399/405

(58) Field of Classification Search
None
See application file for complete search history.

(56) References Cited

U.S. PATENT DOCUMENTS

| | | | |
|---|---|---|---|
| 5,172,178 A | 12/1992 | Oushiden et al. | |
| 5,574,551 A | 11/1996 | Kazakoff | |
| 6,075,623 A | 6/2000 | Yun | |
| 6,459,825 B1* | 10/2002 | Lippincott | 382/312 |
| 6,647,222 B1 | 11/2003 | Digby et al. | |
| 6,648,324 B2 | 11/2003 | Hoberock et al. | |
| 7,587,146 B2 | 9/2009 | Horn | |
| 7,796,788 B2 | 9/2010 | Waara | |
| 8,387,972 B1 | 3/2013 | Ledgerwood et al. | |
| 2006/0180981 A1 | 8/2006 | Miki | |
| 2010/0245859 A1* | 9/2010 | Morgan | 358/1.9 |
| 2011/0070009 A1* | 3/2011 | Bridges | 399/405 |
| 2011/0149310 A1* | 6/2011 | Sekhon | 358/1.9 |
| 2012/0281202 A1 | 11/2012 | Lo et al. | |

* cited by examiner

*Primary Examiner* — Marivelisse Santiago Cordero
*Assistant Examiner* — Moustapha Diaby
(74) *Attorney, Agent, or Firm* — Hoffmann & Baron, LLP

(57) ABSTRACT

A system, method, and apparatus are presented for custom media size detection in a printing device. A user places standard or custom sized media in a media tray associated with a printing device. The media tray contains a media tray sensor which determines whether the media tray is closed and a media size sensor which determines whether the media tray is loaded with custom size media. If so, a computer processing device connected to the sensors and a visual display displays to the user the opportunity to select a media platen and image scanning device to scan an example media item with the same dimensions as the custom size media located in the media tray. The scanning device selected then scans an example media item a user has placed on the selected media platen, and data on the determined dimensions is presented to the user for confirmation or modification.

18 Claims, 7 Drawing Sheets

MEDIA PLATEN USED TO SCAN AND MEASURE MEDIA SIZE IN A TRAY

TECHNICAL FIELD

The present disclosure is directed towards a system, method, and apparatus for utilization of a media platen and image scanning device to automatically determine the dimensions of an item of custom media (such as paper, labels, etc.), after sensors associated with a media tray have detected items of custom media located within the media tray. A visual display displays a graphic user interface to the user, which facilitates the user selecting a certain media platen to perform scanning and allows review and confirmation of the determined dimensions of the item of custom media placed on the media platen. This serves to allow accurate printing on items of custom media size located in the media tray with a minimum of hassle for the user.

BACKGROUND

Since modern multi-function printing devices have numerous capabilities it is possible to utilize these capabilities in creative ways to perform functions which might have been performed manually in an older printing device. For an example, in the case of alignment of color printing heads, an image scanning device associated with the printing device which is typically used for scanning of photos and documents can also be utilized to scan a special color printout made by the printing device needing calibration in order to determine whether the printer's color printing heads or jets needs to be calibrated, and if so by how much.

In a modern printing device presenting the ability to print on various types of media, as users change the size of media (such as changing between sizes of paper, transparencies, cardboard, labels, envelopes, posters, or even between traditional media types and non-traditional media types such as, for example, t-shirts etc.) to be printed on, users are confronted with the necessity of manually changing size settings located on the printing device itself or by changing size settings in a computer software application managing the printing device. While this this is not a particularly time-consuming task if performed only once in a while, if it is performed many times over the course of a day it becomes tedious and frustrating. Accordingly, a need exists for a fast and simple method of communicating to a printing device the size of media loaded, allowing fast and accurate printing on custom as well as standard media sizes without manually changing media size settings every time a change is made in media.

A need presents itself for an automated method of changing media size settings as a user changes media sizes or even types in a printing device, granting the greatest time-savings to the user particularly in situations where a number of different custom-sized media are to be printed on a daily basis.

SUMMARY

The present invention is directed towards a system, method, and apparatus for custom media size detection for use in connection with a printing device, allowing media tray programming simplification. As a user changes media the new media might be of a different and custom (i.e. non-traditional) size, which typically would require changing of settings manually by a system user. The invention presents the advantage of simplifying the tedious step of manually changing settings as media is changed, whether between standard and custom media or custom media of different sizes.

The invention comprises in-part a media tray designed to hold either one or a plurality of media items. The media tray is part of a printing device and can be designed to hold various types of media including paper, transparencies, cardboard, labels, envelopes, posters, boxes, or even non-traditional types of media such as t-shirts, compact discs, etc. The media tray has associated with it in various embodiments of the invention a media tray sensor, as well as a first media size sensor, and sometimes a second media size sensor. The media tray sensor determines whether the media tray is open or closed, thusly indicating whether the user has open and shut the media tray, and, therefore, whether it is possible for a new item or items of custom media to have been loaded into the media tray by a user. The first and second media size sensors therefore determine whether a media tray is loaded with an item or items of custom media.

The invention further comprises a computer processing device operatively connected to the media tray sensor and media size sensors which sensors indicate to the computer processing device whether the media tray is closed and whether the media size sensors indicate a custom media size. If so, the computer processing device in connection with a visual display displays a window allowing a user to select a media platen of one or multiple media platen associated with the printing device to scan an item of custom media a user places on the platen.

The invention yet further comprises a media platen and an image scanning device operatively connected to the computer processing device which are used for their standard purposes (i.e. allowing a user to scan documents, photos, and other media) as well as allowing a user to scan an example media item placed on the media platen having the same dimensions as the custom media item or items that the user has placed in the media tray previously. The media platen and image scanning device determine dimensions of the example media item and generate a data structure indicating the determined dimensions. The computer processing device then receives this data structure containing the determined dimensions and displays a confirmation window or example scan measurement confirmation screen to the user indicating the determined dimensions. In some embodiments of the invention the user can review the determined dimensions and confirm if they are correct, or correct them if they are not.

In an alternate embodiment of the invention, after the media tray associated with the media tray sensor, first media size sensor, and second media size sensor have detected a custom media size, a media handling assembly delivers an item of custom media from the media tray directly to a media platen for scanning without requiring assistance of a user. In some embodiments, windows are still presented to the user for selection of a media platen and for display of a window on a visual display for confirmation by the user that the correct dimensions have been obtained.

These and other aspects, objectives, features, and advantages of the disclosed technologies will become apparent from the following detailed description of illustrative embodiments thereof, which is to be read in connection with the accompanying drawings.

DETAILED DESCRIPTION

Describing now in further detail these exemplary embodiments with reference to the figures as described above, the custom media size detecting system, method, and apparatus is described below. It should be noted that the drawings are not to scale.

As used herein, a "printer," "printing assembly," "printing device," or "printing system" refers to one or more devices used to generate "printouts" or a print outputting function, which refers to the reproduction of information on an "item of media," "substrate media," "media substrate," or "media sheet" for any purpose. A "printer," "printing assembly," "printing device," or "printing system" as used herein encompasses any apparatus, such as a digital copier, bookmaking machine, facsimile machine, laser-printer, dot-matrix printer, multi-function machine, etc. which performs a print outputting function.

A printer, printing assembly, printing device, or printing system can use an "electrostatographic process" to generate printouts, which refers to forming and using electrostatic charged patterns to record and reproduce information, a "xerographic process," which refers to the use of a resinous powder on an electrically charged plate to record and reproduce information, or other suitable processes for generating printouts, such as a dot-matrix process, an ink jet process, a liquid ink process, a solid ink process, and the like. Also, such a printing device can print and/or handle either monochrome or color image data.

As used herein, "media item," "item of media," "media substrate," and "media sheet" refer to, for example, paper, transparencies, cardboard, labels, photo-finishing papers, envelopes, posters, boxes, or even non-traditional items that can be printed upon, such as t-shirts, compact discs, parchment, film, fabric, plastic, photo-finishing papers, or other coated or non-coated substrates on which information can be reproduced, preferably in the form of a sheet or web. While specific reference herein is made to a sheet or paper, it should be understood that any media substrate in the form of a sheet amounts to a reasonable equivalent thereto. Also, the "leading edge" of a media substrate refers to an edge of the sheet that is furthest downstream in the process direction.

As used herein, a "media handling assembly" and "media transport" refers to one or more devices used for handling and/or transporting media substrate, including feeding, printing, finishing, registration, and transport systems. These include nip rollers and belts.

As used herein, the terms "process" and "process direction" refer to a procedure of moving, transporting and/or handling a substrate media. The process direction is a flow path the media substrate moves in during the process.

Figure 1:
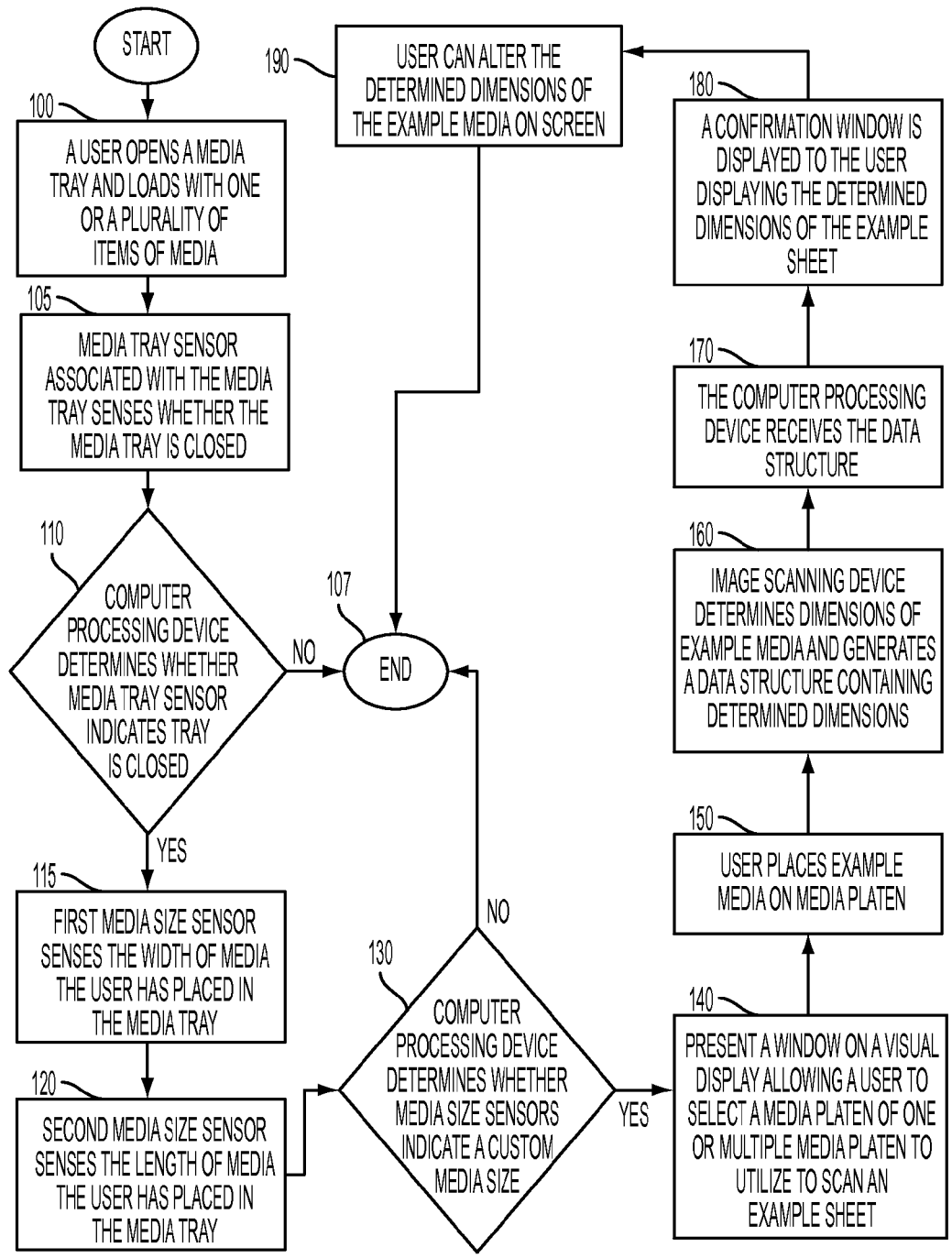
FIG. 1 is a flowchart indicating the process of execution of an embodiment of the invention.

Referring to FIG. 1, displayed is a flowchart indicating execution of an embodiment of the invention. At step 100 a user opens a media tray of a printing device and loads with one or more items of media. The media may be standard sized or custom. Standard sized media include A0, A1, A2, A3, A4, A5, A6, A7, and A8, legal, or labels. Depending on the country other sizes of media may be standard and are anticipated within the scope of the invention, such as in Japan B0, B1, B2, B3, etc. or C0, C1, C2, etc. Contemplated are presently existing standard paper sizes and after-arising ones, as well as standard sized transparencies, labels (such as Avery® 5160, 18660, etc.), and any of a number of media capable of being printed upon. The media loaded at step 100 may also be custom sized, i.e. any which is not of the standard sizes discussed above. At step 105 a media tray sensor associated with the media tray of a printing device detects whether the media tray has been closed. The media tray sensor may operate by microswitches actuated by leaf springs, other mechanical means, optical means, or any other presently existing or after-arising technology allowing sensing of whether the media tray is opened or closed. At step 110 a computer processing device operatively connected to the media tray sensor determines whether the media tray sensor indicates the tray is closed. The computer processing device can comprise one or multiple processors acting together simultaneously, a logic device, an embedded system, or any other device allowing for programming and decision making. In one embodiment it may be multiple processors or circuitry performing discrete tasks in communication with each other. If the computer processing device determines the media tray sensor indicates the tray is not closed, execution terminates 107. If execution has continued, a first media size sensor located in the media tray determines a width of the media a user has placed in the media tray at step 115. At step 120 a second media size sensor located in the media tray determines a length of media a user has placed in the media tray. The media size sensors may optically or mechanically detect the size of paper or other media placed in the media tray, or detect media size utilizing any other presently existing or after-arising technology. In a preferred embodiment, the media tray sensors are two mechanical, moving guides that are pushed up against an item or a plurality of media placed in the media tray, measuring the rough dimensions of the media items by distance along a track of travel. These described mechanical tray sensors can be either manually pushed by a user up against the media items in the media tray when the tray is open, or may be automatically pushed by electric motor or other means against the media items in the media tray automatically when the media tray is closed. At step 130 the computer processing device determines whether media size sensors indicate a custom media size. After the media size sensors scan the approximate size of the media placed in the media tray, the information is then transmitted to the computer processing device that has been programmed with the sizes of various standard size media, which computer processing device then determines whether standard media size items or custom media size items have been placed in the media tray. If no, execution terminates 107. On the other hand, if the media size sensors determine a custom media size is present, at step 140 a window is presented on a visual display operatively connected to the computer processing device, allowing a user to select a media platen of one or more media platen associated with the printing device to allow the user to scan an example media item with the same dimensions as the items of custom media the user has placed in the media tray. The media platen and image scanning device are associated with a first scanning sensor and a second scanning sensor which are operatively connected with the computer processing device. At step 150 the user then places an example media item having the same dimensions as the item or items of custom media located in the media tray on the media platen selected by the user. The media platen and image scanning device then determine at step 160 the dimensions of the example media item and generate a data structure indicating the determined dimensions. The data structure can be any electronic means of transmitting information between functional elements in the presently disclosed invention. At step 170 the computer processing device receives the data structure. At step 180, the visual display with the graphic user interface then displays a confirmation window (or, in some embodiments, an example scan measurement confirmation screen) to the user, displaying the determined dimensions of the example media item. In some embodiments of the invention, at step 190 a user can alter the determined dimensions displayed in the graphic user interface to be in-line with what is desired.

Figure 2:
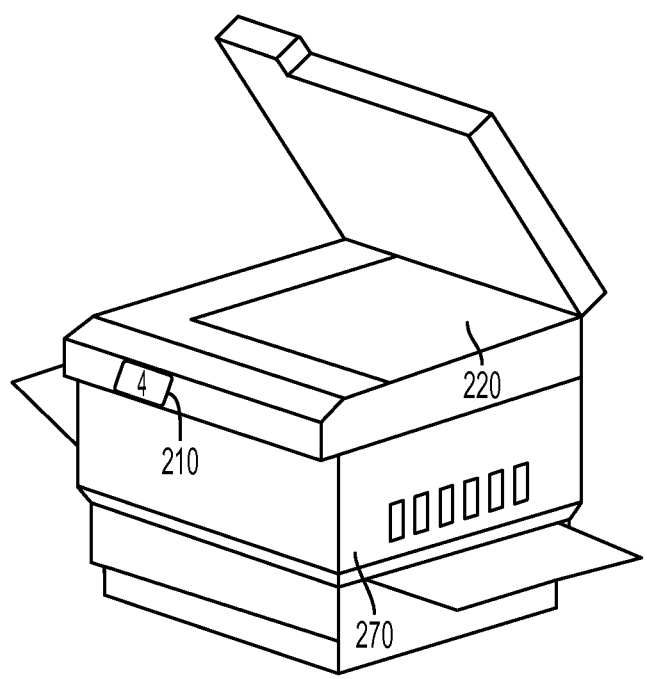
FIG. 2 is simple diagram displaying a printing device, displaying elements of an embodiment of the invention.

Referring to FIG. 2, displayed is a simple diagram of a printer displaying elements of an embodiment invention. Shown is a small visual display 210 displaying a graphic user interface (not visible here) for a user to interact with. Also shown is a media platen 220 (composed of glass) allowing a user to scan an example media item a user places on the media platen. As can be seen in this figure, the media platen 220 being utilized to scan the example media item is the same that would be utilized by the user to scan any media during normal printer operation. The scanning actually takes place via an image scanning device (not shown) which resides below the media platen 220. The image scanning device operates in various embodiments as a charge-coupled device (CCD), contact image scanner (CID), or a photomultiplier tube. Other presently existing or after arising technologies allowing scanning of items of media are contemplated. Also displayed is the outside of a media tray 270 allowing a user to load a plurality of items of media, including in this embodiment sheets of paper, labels, envelopes, etc. These items of media can be of varying sizes, as discussed herein.

Figure 3:
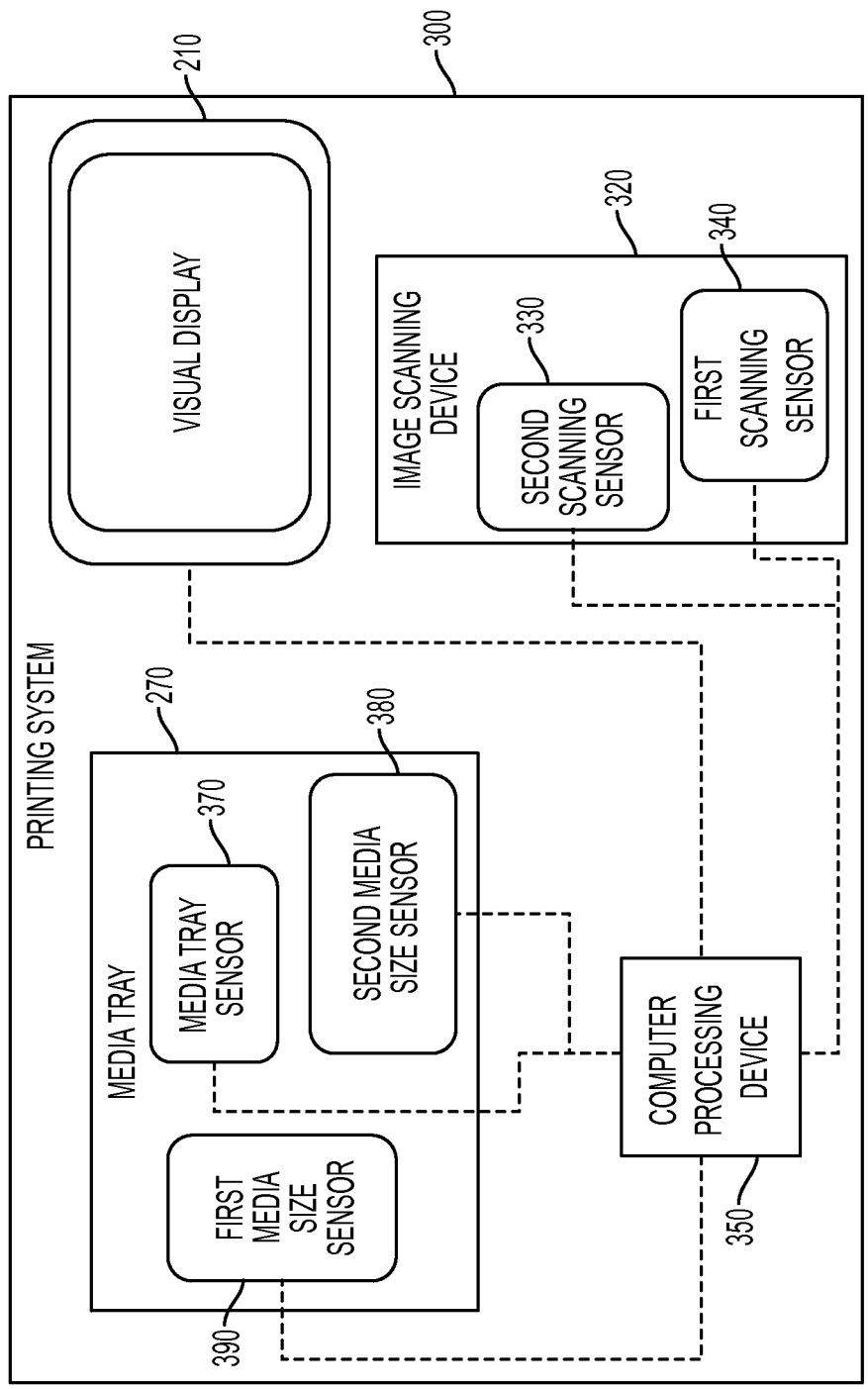
FIG. 3 is a block diagram of a printing device displaying elements of an embodiment of the invention.

Referring to FIG. 3, displayed is a block diagram of a printing device 300 displaying elements of an embodiment of the invention. Seen is the visual display 210 operatively connected to a computer processing device 350. The visual display 210 can take the form of a light-emitting diode display (LED), liquid-crystal display (LCD), an electroluminescent display (ELD), electronic paper, a plasma display panel (PDP), an organic light-emitting diode display (OLED), or any other currently existing or after-arising equivalent. The visual display 210 will display a graphic user interface and a window allowing a user to select a media platen of one or multiple media platen associated with the printing device to scan an item of custom-media. The visual display 210 will also display various data to the user including a confirmation window using a graphic-user interface (or, in some embodiments an example scan measurement confirmation screen) allowing the user to view the determined dimensions of custom-sized media a user has placed on the media platen. The confirmation window allows, in some embodiments, a user to alter the determined dimensions of the example media item on the screen. In order to allow the user to communicate with visual display 210, in various embodiments of the invention the visual display 210 is equipped with either a keyboard allowing direct user data entry, a touch-screen (enabled by capacitive, resistive, or surface acoustic wave screen), or any other equivalent or after-arising technology. The computer processing device 350 can comprise of one or multiple processors acting together simultaneously, a logic device, an embedded system, or any other device allowing programming and decision making. The computer processing device 350 is also operatively connected a first media sensor 390, a second media sensor 380, and a media tray sensor 370 associated with a media tray 270. The media tray 270 has associated with it in various embodiments of the invention a first media size sensor 390, a second media size sensor 380, and a media tray sensor 370. The media tray sensor 370 determines whether the media tray 270 is open or closed. The media tray sensor 370 may operate via microswitches actuated by leaf springs, other mechanical means, optical means, or any by any other presently existing or after-arising technology allowing sensing of whether the media tray is open or closed. The first media size sensor 390 determines a dimension of media a user has placed in the media tray 270. In some embodiments of the invention, the first media size sensor 390 determines an approximate width of an example media item when determining whether a standard-sized or custom-sized media item has been placed in the media tray 270. In other embodiments of the invention, the second media size sensor 380 determines an approximate length of an example media item placed in the media tray 270, in determining whether a standard or custom-sized media item has been placed in the media tray 270. The first and second media size sensors 380 and 390 may operate via mechanical, optical, or any other means to determine the size of a custom media that has been placed in the media tray. The first media size sensor 390, second media size sensor 380, and media tray sensor 370 all provide data to the computer processing device 350. The computer processing device 350 is also operatively connected to one or several image scanning devices 320. The image scanning devices sit underneath a media platen which is typically composed of glass plates, but could be composed of any transparent substance such as plastic. As discussed previously, the image scanning device 320 operates in various embodiments as a charge-coupled device (CCD), contact image scanner (CID), or a photomultiplier tube. In some embodiments, the image scanning device 320 has associated with it a first scanning sensor 340 and in other embodiments also a second scanning sensor 330. In certain embodiments, the first scanning sensor 340 determines the width of an item of custom media a user places on it. In some embodiments the second scanning sensor 330 will also determine a length of an item of custom media a user places on it. In other embodiments the image scanning device beneath the media platen 220 will scan irregularly shaped custom media placed on top of it and transmit determined dimensions to the computer processing device 350.

Figure 4:
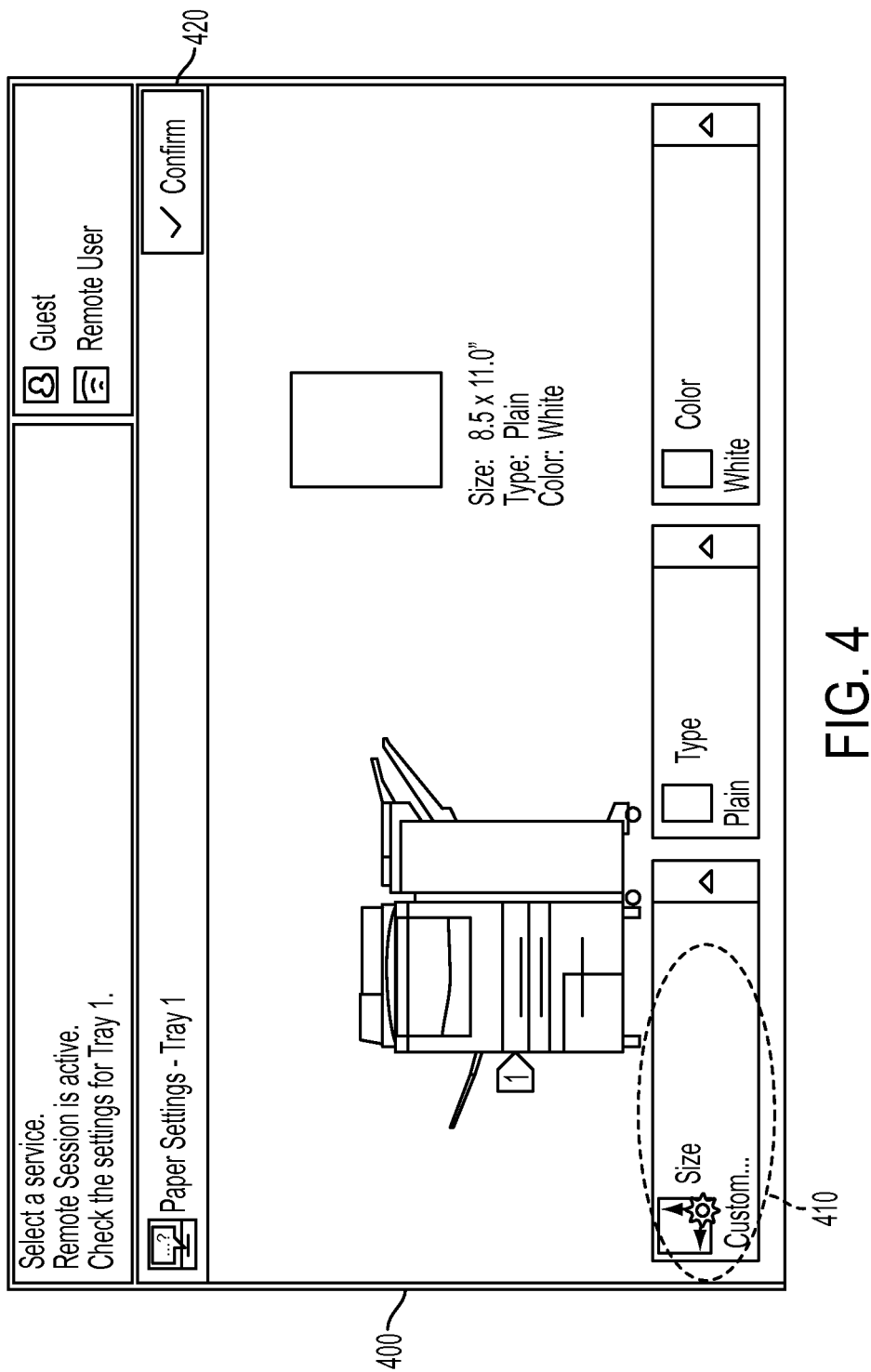
FIG. 4 is a sample screen as seen on a visual display in an embodiment of the invention.

Referring to FIG. 4, displayed is a custom media size detection screen 400 seen on a visual display in an embodiment of the invention. In some embodiments, this screen is displayed to a user when the first media size sensor has detected a custom media size after the media tray has closed. When this occurs, a media-size graphic user interface window 410 automatically updates to indicate that a custom media size is detected, requiring further action. In some embodiments, the user has the option to override media-size graphic user interface window 410 and select a standard media size such as A4, A6, Avery® 4160, etc. After the user has altered all selections as desired, the user selects the "Confirm" button 420 to proceed.

Figure 5:
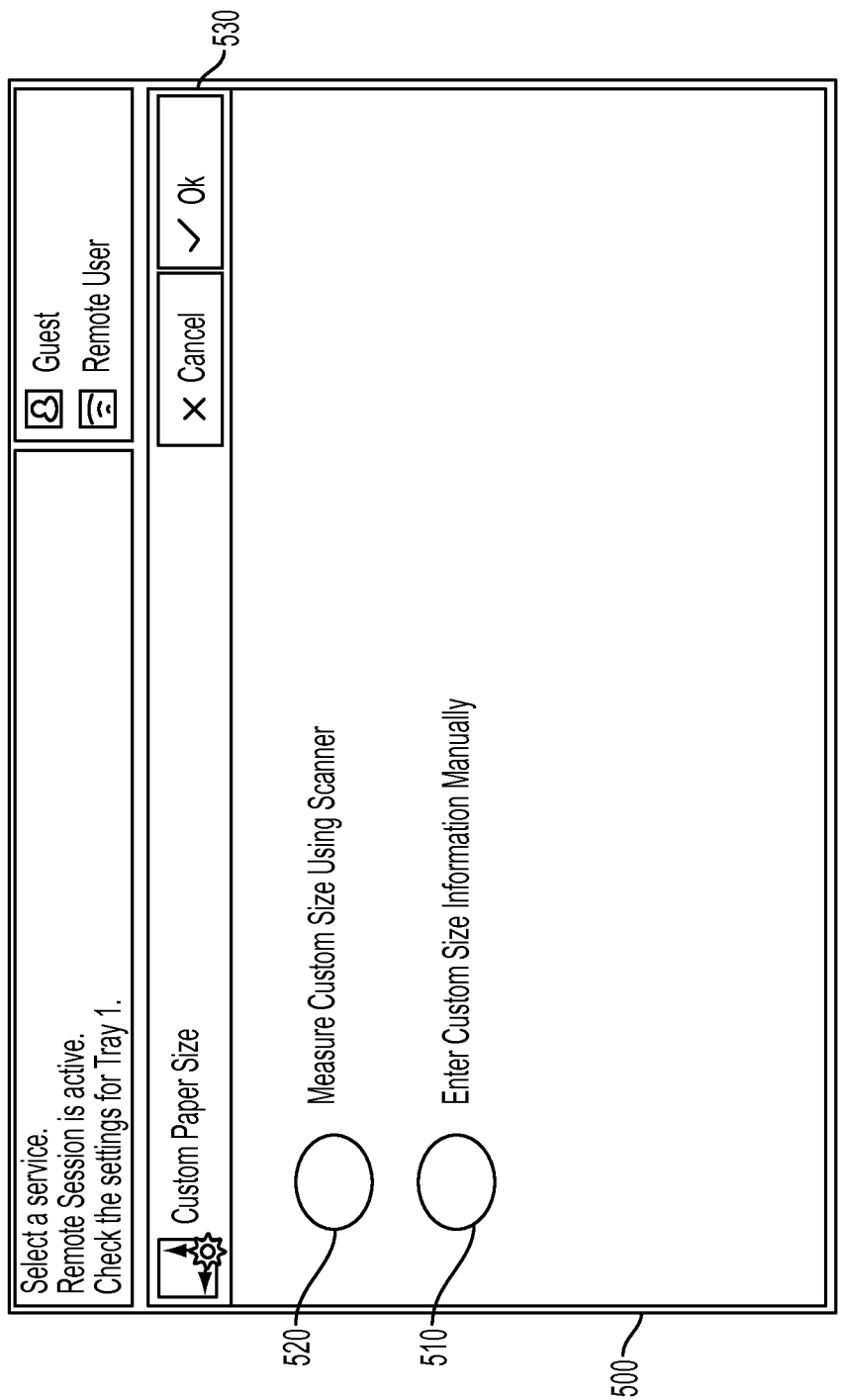
FIG. 5 is a sample screen as seen on a visual display in an embodiment of the invention.

Referring to FIG. 5, displayed is a media size detection election screen 500. In some embodiments, after the user is presented with the custom media size detection screen 400 and has hit the Confirm button 420, the user is presented with the media size detection election screen 500. The user can select to enter the dimensions of custom media size manually 510. The user can also select to utilize an image scanning device to measure the custom media size 520. In some embodiments of the invention a window is alternately projected allowing a user to select one of multiple media platen to perform the scanning (not shown here). If the printing device only has one media platen associated with it, only that platen will appear to be selected by the user. When the user's selections are complete, the user can select the "OK" button 530 to proceed.

Figure 6:
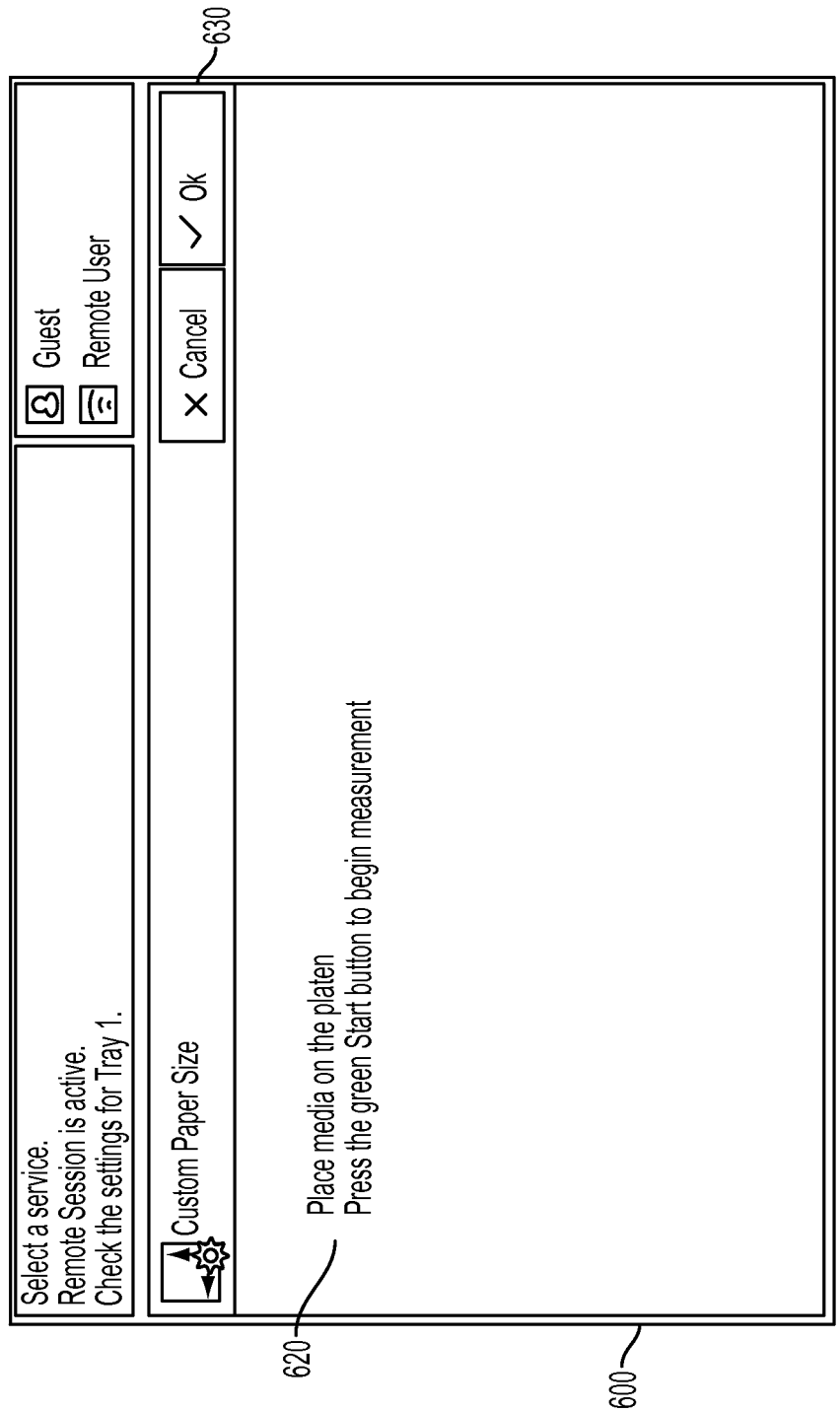
FIG. 6 is a sample screen as seen on a visual display in an embodiment of the invention.

Referring to FIG. 6, displayed is a custom media size scan start screen 600. In some embodiments, after the user is presented with the media size detection election screen 500 and has hit the "OK" button 530 to confirm, the user is then presented the custom media size scan start screen 600. The user is presented with an indicator 620 to "Place media on the platen" and "Press the green Start button to begin measurement." The user then hits the "OK" button 630 to proceed. Scanning of the custom media item then proceeds.

Figure 7:
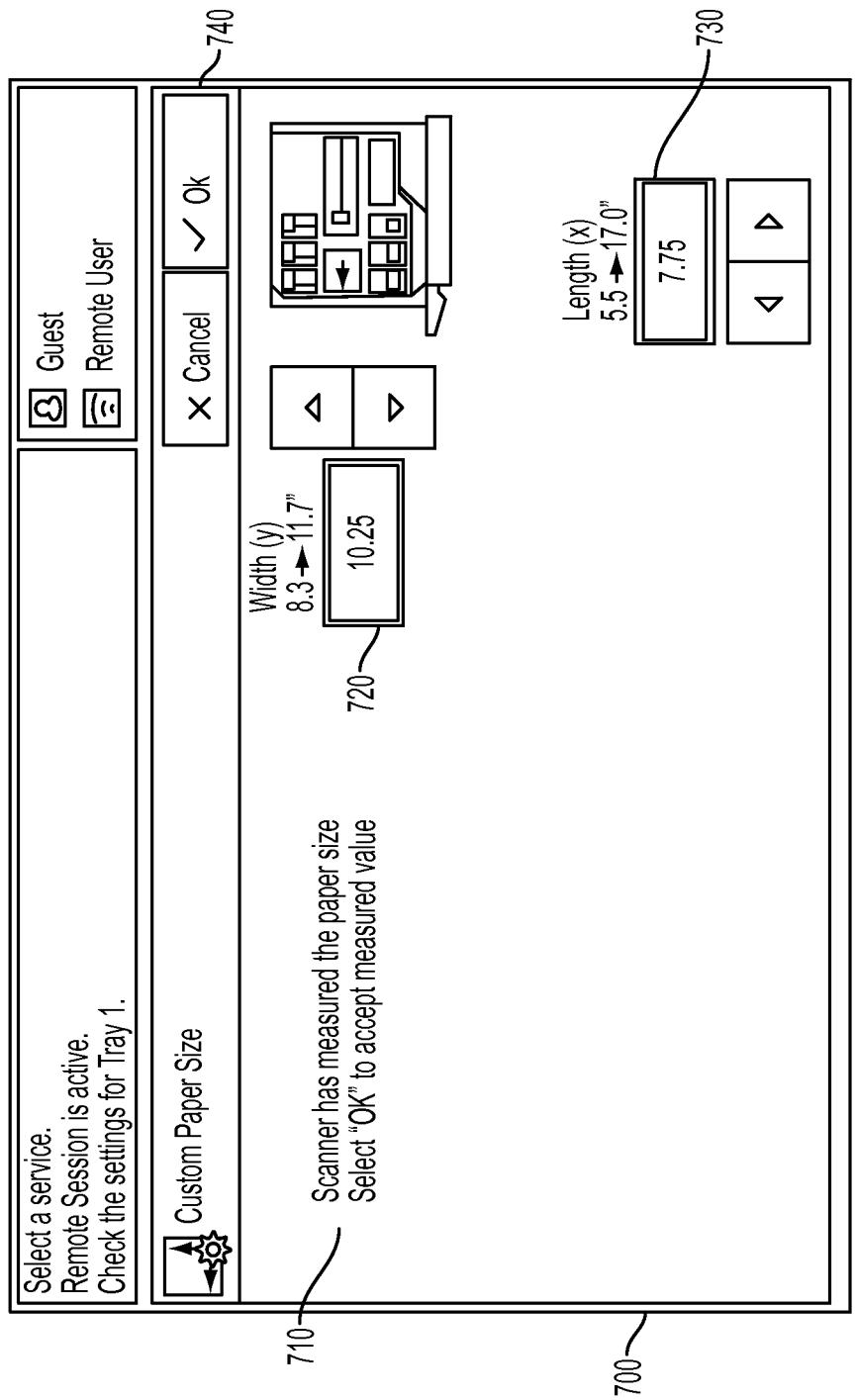
FIG. 7 is a sample screen as seen on a visual display in an embodiment of the invention.

Referring to FIG. 7, displayed is a scan measurement confirmation screen 700. In some embodiments, after the user has been presented with the custom media size scan start screen 600 and has hit the "OK" button 630 to proceed, the user is presented with the scan measurement confirmation screen 700. The user is informed that the "scanner has measured the paper size" and to "select 'OK' to accept measured value" 710. The width of the scanned paper or other media item is presented as window 720 and the length of the scanned paper or other media item is presented as window 730. In some embodiments the user can alter windows 720 and 730 manually to better reflect the actual media size. Once fields 720 and 730 have been altered to satisfaction, the user can select the "OK" button 740.

The preceding description has been presented only to illustrate and describe the invention. It is not intended to be exhaustive or to limit the invention to any precise form disclosed. Many modifications and variations are possible in light of the above teachings.

The preferred embodiments were chosen and described in order to best explain the principles of the invention and its practical application. The preceding description is intended to enable others skilled in the art to best utilize the invention in its various embodiments and with various modifications as are suited to the particular use contemplated. It is intended that the scope of the invention be defined by the following claims.

What is claimed is:

1. A custom media size detecting system for use in connection with a printing device for media tray programming simplification comprising:
   a media tray designed to hold a plurality of items of media having a media tray sensor which detects whether said media tray is closed and a first media size sensor which determines whether said media tray is loaded with an item or items of custom media;
   a computer processing device operatively connected to said media tray sensor and said first media size sensor which determines whether said media tray sensor indicates said media tray is closed and determines whether the first media size sensor indicates the media tray is loaded with an item or items of custom media;
   wherein if said media tray sensor indicates the media tray is closed and if said first media size sensor indicates said media tray is loaded with an item or items of custom media, a visual display operatively connected with the computer processing device displays a window allowing a user to select a media platen of one or multiple media platen associated with the printing device to scan an item of same-sized custom media a user places on said platen;
   a media platen and an image scanning device having a first scanning sensor operatively connected to said computer processing device which scans an example media having the same dimensions as the item or items of custom media loaded into the media tray which example media the user has placed on said media platen and determines dimensions of the example media and then generates a data structure indicating determined dimensions of said same-sized custom-sized media and transmits the data structure to the computer processing device;
   wherein said computer processing device receives said data structure containing said determined dimensions of said custom-sized media item and displays a scan measurement confirmation window on said visual display to said user displaying said determined dimensions of said same-sized custom-sized media.

2. The custom media size detecting system of claim 1 wherein said media platen is the same media platen utilized for user image input in a printing device.

3. The custom media size detecting system of claim 1 wherein said first scanning sensor determines a width of the item of same-sized custom media.

4. The custom media size detecting system of claim 3 wherein said printing device further comprises a second scanning sensor which determines a length of the item of same-sized custom media.

5. The custom media size detecting system of claim 1 wherein said scan measurement confirmation window allows the user to manually alter the determined dimensions of the custom-sized media.

6. The custom media size detection system of claim 1 wherein said first media size sensor determines a width of the item or items of custom media located in the media tray.

7. The custom media size detection system of claim 6 further comprising a second media size sensor which determines the length of an item or items of custom media located in the media tray.

8. The custom media size detection system of claim 7 wherein said first media size sensor and said second media size sensor are mechanically operated by the user of the printing device.

9. The custom media size detection system of claim 7 wherein said first media size sensor and said second media size sensor are operated automatically by an electrical motor.

10. A method for custom media size determination in a printing device comprising:
    detecting by a media tray sensor associated with a media tray the media tray being closed and detection by a first media size sensor associated with the media tray that the media tray is loaded with an item or items of custom media;
    determining by a computer processing device whether said media tray sensor indicates the media tray is closed and whether the first media size sensor indicates the media tray is loaded with an item or items of custom media;
    displaying by a visual display operatively connected to the computer processing device a window allowing a user to select a media platen of one or multiple media platen associated with the printing device to scan an item of same-sized custom media a user places on said platen;
    scanning by an image scanning device having a first scanning sensor operatively connected to said computer processing device an example media having the same dimensions as the item or items of custom media loaded into the media tray and generating a data structure containing determined dimensions of said same-sized custom-sized media followed by transmitting the data structure to the computer processing device;
    receiving by the computer processing device the data structure containing the determined dimensions of the same-sized custom media and displaying to said user the determined dimensions.

11. The method of claim 10 wherein said media platen is the same media platen utilized for user image input in a printing device.

12. The method of claim 10 wherein said first scanning sensor determines a width of the item of same-sized custom media.

13. The method of claim 12 wherein said printing device further comprises a second scanning sensor which determines a length of the item of same-sized custom media.

14. The method of claim 10 wherein said scan measurement confirmation window allows the user to manually alter the determined dimensions of the same-sized custom media.

15. The method of claim 10 wherein said first media size sensor determines a width of the item or items of custom media located in the media tray.

16. The method of claim 15 further comprising a second media size sensor which determines a length of an item or items of custom media located in the media tray.

17. The method of claim 16 wherein said first media size sensor and said second media size sensor are mechanically operated by the user of the printing device.

18. The method of claim 16 wherein said first media size sensor and said second media size sensor are operated automatically by an electrical motor.

* * * * *